US010823301B2

(12) United States Patent
Zak

(10) Patent No.: US 10,823,301 B2
(45) Date of Patent: Nov. 3, 2020

(54) SERVOVALVE

(71) Applicant: Hamilton Sundstrand Corporation, Charlotte, NC (US)

(72) Inventor: Maciej Zak, Dolnoslaskie (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/286,834

(22) Filed: Feb. 27, 2019

(65) Prior Publication Data

US 2019/0277419 A1   Sep. 12, 2019

(30) Foreign Application Priority Data

Mar. 8, 2018 (EP) .................... 18461528

(51) Int. Cl.
F16K 21/00 (2006.01)
H02K 26/00 (2006.01)
F15B 13/043 (2006.01)

(52) U.S. Cl.
CPC .......... F16K 21/00 (2013.01); F15B 13/0438 (2013.01); H02K 26/00 (2013.01); Y10T 137/87209 (2015.04)

(58) Field of Classification Search
CPC ..... F16K 21/00; F15B 13/0438; H02K 26/00; Y10T 137/87209
USPC .................................................. 137/596.16
See application file for complete search history.

(56) References Cited

U.S. PATENT DOCUMENTS

| 2,823,689 | A | 2/1958 | Healy |
| 4,793,377 | A | 12/1988 | Haynes et al. |
| 4,794,941 | A | 1/1989 | Godon |
| 4,922,963 | A | 5/1990 | Robinson |
| 5,146,126 | A | 9/1992 | Hutchins |
| 2002/0066480 | A1 | 6/2002 | Anderson |
| 2016/0049230 | A1* | 2/2016 | Cichon .................. H01F 7/021 251/30.01 |

FOREIGN PATENT DOCUMENTS

JP    2000032731 A    1/2000

OTHER PUBLICATIONS

Extended European Search Report for International Application No. 18461528.4 dated Sep. 25, 2018, 7 pages.

* cited by examiner

*Primary Examiner* — William M McCalister
(74) *Attorney, Agent, or Firm* — Cantor Colburn LLP

(57) ABSTRACT

A valve body for a servovalve is provided comprising: a first surface adapted to extend parallel and adjacent to a substantially flat pole piece surface of a pole piece in use; and attachment features provided on the first surface for attaching the valve body to the pole piece in use, wherein the first surface is contoured such that, in use, an area of the first surface surrounding the attachment features is in contact with the substantially flat pole piece surface and an area of the first surface removed from the attachment features is not in contact with the substantially flat pole piece surface.

14 Claims, 5 Drawing Sheets

SERVOVALVE

FOREIGN PRIORITY

This application claims priority to European Patent Application No. 18461528.4 filed Mar. 8, 2018, the entire contents of which is incorporated herein by reference.

TECHNICAL FIELD

The present disclosure relates to servovalves and to valve bodies for use in servovalves.

BACKGROUND

Servovalves are typically used to control air or other fluid flow to effect driving or control of another part, e.g. an actuator.

A servovalve typically comprises a first subsystem comprising a torque motor which acts as a driver to a second subsystem. In one example, the second subsystem may contain a fluid such as fuel, hydraulic fluid or air and comprises a valve mechanism which may control flow of the fluid.

The torque motor typically comprises coils, pole pieces and permanent magnets which act to cause rotation of a torsion bridge when the coils are energised in a manner known in the art. The rotation of the torsion bridge may cause movement of a moveable member, for example, a flapper, which causes opening or closing of the valve mechanism of the second subsystem.

To achieve optimum servovalve performance it is important that the torque motor must function in a very precise and linear manner. Factors which cause sub-optimal performance of the magnetic fields generated by the torque motor may have a negative impact on the function of the torque motor. Designers are being challenged to provide a torque motor for a servovalve which provide improved reliability of the magnetic fields generated.

The present disclosure seeks to address these challenges.

SUMMARY

According to an aspect of the present disclosure there is provided a valve body for a servovalve that includes a first surface adapted to extend parallel and adjacent to a substantially flat pole piece surface of a pole piece in use and attachment features provided on the first surface for attaching the valve body to the pole piece in use is disclosed. The first surface is contoured such that, in use, a first area of the first surface surrounding the attachment features is in contact with the substantially flat pole piece surface and a second area of the first surface removed from the attachment features is not in contact with the substantially flat pole piece surface.

Thus it will be seen by those skilled in the art that, in accordance with the present disclosure, the surface of the valve body is contoured such that, in use, a portion or area of the pole piece surface removed from the attachment features is not in contact with the surface of the valve body. This will reduce the stresses and strains induced in the pole piece when in situ in the valve, thus reducing the degradation in the magnetic properties of the pole piece and improving the performance of the servovalve.

In any preferred example of the present disclosure, the first surface may be contoured so as to maximise the first area of the first surface which is not in contact with the substantially flat pole piece surface. This will reduce any detrimental bending forces or stress on the pole piece as much as possible.

It will be understood that the first surface of the valve body could be contoured in many different ways. In any preferred example, a groove may be formed in the first surface to provide the contoured surface. This will provide a simple and cost effective means of machining or otherwise producing the contour in the first surface.

A drainage channel may be provided in the first surface extending from the groove to an edge of the first surface.

It will be understood that the attachment features could take many different forms. Preferably, the attachment features comprise a plurality of holes formed in the first surface and extending into the valve body for receiving mating attachment members in use.

It will be understood that the valve body may further comprise a second surface spaced from the first surface in a first direction.

The groove may extend from an edge of the first surface towards a centre of the first surface in a second direction.

The groove may have a depth extending in the first direction and may have a thickness in a third direction perpendicular to the second direction.

It will be understood that only a single groove could be provided, for example extending towards and stopping before reaching the centre of the first surface. In many examples however, pole pieces and magnets may be provided on both sides of a servovalve. In any aspect of the disclosure therefore, a second groove may be formed in the first surface, the second groove extending from an opposite edge of the first surface towards the centre of the first surface.

It will be understood that the groove(s) in the valve body could be formed by various different methods such as, for example, by machining. It would be possible to machine two separate grooves in the valve body, leaving a gap, or part of the first surface, between the first and second grooves. Preferably however, and in any example of the present disclosure, the groove and the second groove may join to form a continuous groove extending from the first edge of the first surface to the opposite edge thereof. It will be appreciated that this arrangement having one continuous groove extending across the whole of the first surface will be relatively simple and cost effective to manufacture.

The pole piece may have a thickness, the pole piece surface extending across the thickness thereof; and the second area of the first surface may extend across the thickness thereof.

From a further aspect which is considered to be novel and inventive in its own right, the invention may provide a valve body for a servovalve that includes: a first surface; a second surface spaced from the first surface in a first direction; a groove formed in the first surface, the groove extending from an edge of the first surface towards a centre of the first surface in a second direction, the groove having a depth extending in the first direction and having a thickness in a third direction perpendicular to the second direction, wherein in use, a pole piece is positioned adjacent the first surface. The pole piece has: a thickness; a pole piece surface extending across the thickness thereof; and adjacent first, second and third portions each extending across the thickness thereof, the pole piece being positioned such that the pole piece surface extends parallel to the first surface of the valve body, the first and third portions of the pole piece surface are in contact with the first surface and the second portion of the pole piece surface extends over the groove such that it is not in contact with the first surface.

Thus it will be seen by those skilled in the art that, in accordance with the present disclosure, the valve body includes a groove formed in the surface thereof such that, in use, a portion of the pole piece is not in contact with the surface of the valve body. This will reduce the stresses and strains induced in the pole piece when in situ in the valve, thus reducing the degradation in the magnetic properties of the pole piece and improving the performance of the servovalve.

It will be understood that only a single groove could be provided, for example extending towards and stopping before reaching the centre of the first surface. In many examples however, pole pieces and magnets may be provided on both sides of a servovalve. Thus, in any example of the present disclosure, a second groove having the depth and thickness of the first groove is preferably formed in the first surface, the second groove extending from an opposite edge of the first surface in a fourth direction opposite to the second direction.

It will be understood that the valve body and the first surface may take various forms depending on the design requirements of the servovalve. Preferably however, and in any example of the present disclosure, the first surface may be circular. Still more preferably, the second direction may be a radial direction.

The valve body according to the disclosure is for use in a servovalve and so from a further aspect, the disclosure provides a servovalve comprising: a valve body as claimed in any preceding claim.

In any example of the present disclosure, the servovalve may further comprise a torque motor, the torque motor including a pole piece having a substantially flat pole piece surface, wherein the pole piece is positioned such that a first area of the first surface surrounding the attachment features is in contact with the substantially flat pole piece surface and a second area of the first surface removed from the attachment features is not in contact with the substantially flat pole piece surface.

From a further aspect which is considered to be novel and inventive in its own right, the invention may provide a servovalve comprising: a valve body; and a pole piece. In this aspect, the valve body comprises: a first surface; a second surface spaced from the first surface in a first direction; a groove formed in the first surface, the groove extending from an edge of the first surface towards a centre of the first surface in a second direction, the groove having a depth extending in the first direction and having a thickness in a third direction perpendicular to the second direction, wherein the pole piece is positioned adjacent the first surface, the pole piece having: a thickness; a pole piece surface extending across the thickness thereof; and adjacent first, second and third portions each extending across the thickness thereof, the pole piece being positioned such that the pole piece surface extends parallel to the first surface of the valve body, the first and third portions of the pole piece surface are in contact with the first surface and the second portion of the pole piece surface extends over the groove such that it is not in contact with the first surface.

In any example of the present disclosure, the pole piece preferably further comprises a fourth portion extending between the third portion and the first portion, the pole piece being positioned such that the fourth portion of the pole piece surface extends over the groove such that it is not in contact with the first surface.

In any example of the present disclosure, the pole piece preferably further comprises: a second pole piece surface spaced from the pole piece surface in a fifth direction opposite to the first direction; and a flange extending from the second pole piece surface in the fifth direction. The flange is positioned over the area of the first surface which is not in contact with the substantially flat pole piece surface.

The pole piece could take various forms. In any example of the present disclosure, the pole piece is preferably annular.

In any example of the present disclosure, a second flange is preferably provided opposite the first flange and extending from the second pole piece surface in the fifth direction, and wherein the second flange is positioned over the area of the first surface which is not in contact with the substantially flat pole piece surface.

In any example of the present disclosure, the servovalve may further comprise: a plurality of members for fixing the pole piece to the valve body; and a plurality of holes formed in the first surface for receiving the members. The thickness of the groove is determined such that the holes are not located within the groove whilst maximising the thickness of the groove. This will maximise the area of the pole piece surface which is not in contact with the first surface, thus reducing any detrimental bending forces or stress on the pole piece as much as possible.

From a further aspect, a method of improving the performance of a pole piece in a servovalve is provided comprising: forming a contoured surface in a first surface of a valve body of the servovalve; and positioning a pole piece adjacent to the first surface such that: a substantially flat pole piece surface of the pole piece extends parallel and adjacent to the first surface of the valve body; a first area of the first surface surrounding the attachment features on the first surface is in contact with the substantially flat pole piece surface; and a second area of the first surface removed from the attachment features is not in contact with the substantially flat pole piece surface.

Forming the contoured surface may preferably comprise forming a groove in the first surface.

From a further aspect, a method of improving the performance of a pole piece in a servovalve is provided comprising: forming a groove in a first surface of a valve body of the servovalve; and positioning a pole piece adjacent to the first surface such that: a pole piece surface of the pole piece extends parallel to the first surface of the valve body; first and third portions extending across a thickness of the pole piece surface are in contact with the first surface; and a second portion of the pole piece surface extending across a thickness of the pole piece surface between the first and third portions extends over the groove such that it is not in contact with the first surface.

The method may preferably further comprise forming the groove to extend from a first side of the first surface to a second side thereof opposite the first side.

From a further aspect which is believed to be novel and inventive in its own right, a method of improving the performance of a torque motor in a servovalve is provided comprising: reducing the depth of a valve body of the servovalve by a first amount; and increasing the depth of a pole piece or of a combination of pole pieces by the first amount.

Features of any example described herein may, wherever appropriate, be applied to any other examples of the present disclosure. Where reference is made to different examples, it should be understood that these are not necessarily distinct but may overlap.

DETAILED DESCRIPTION

One or more non-limiting examples will now be described, by way of example only, with reference to the accompanying drawings, in which:

FIG. 6b is a cross-sectional view along line B-B of FIG. 6a;

FIG. 7b is a section along line B-B of FIG. 7a;

Figure 1:
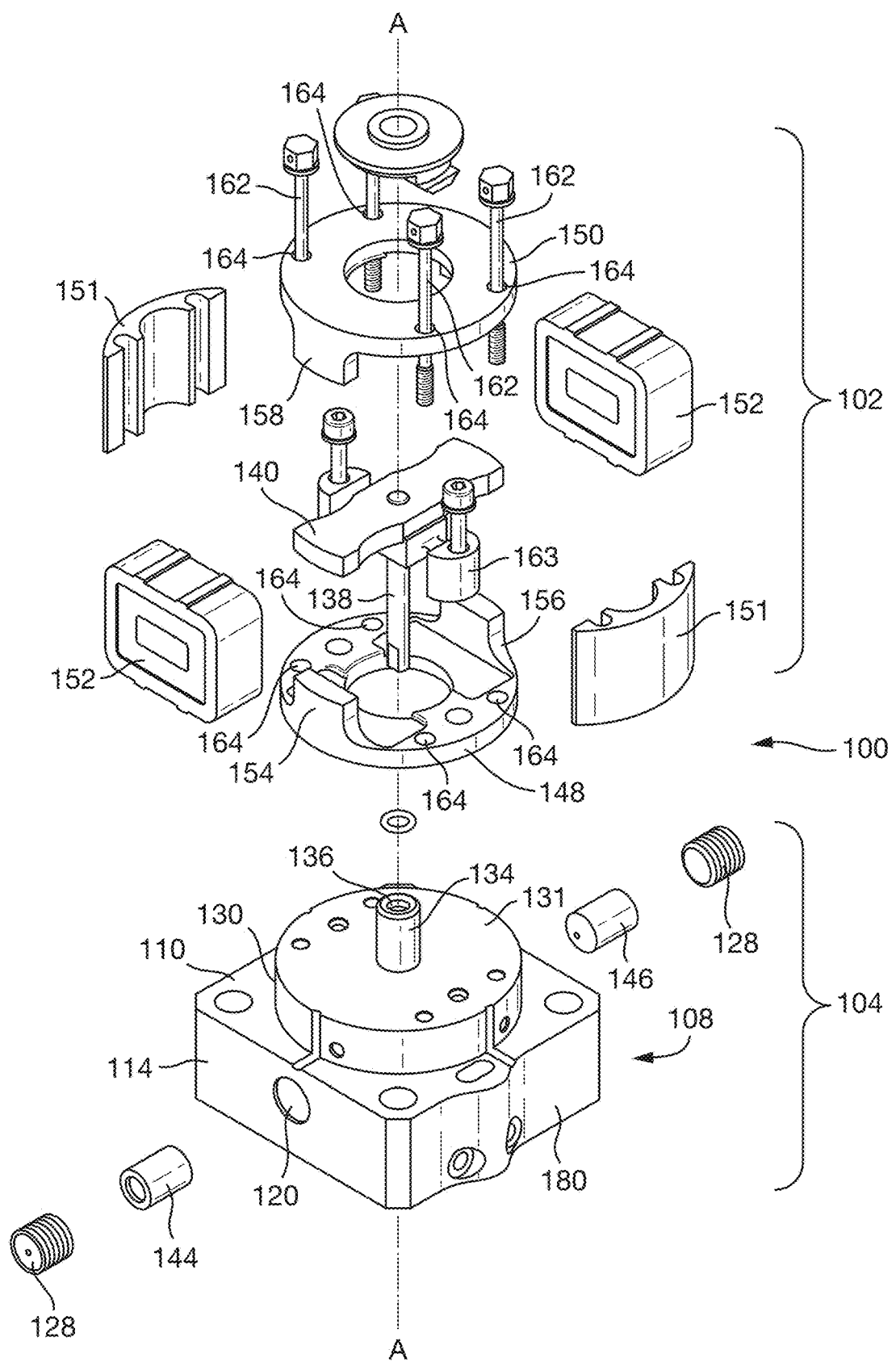
FIG. 1 is an exploded view of a servovalve according to examples typical of the prior art.

As is known in the art, a servovalve is a device used for regulating either the flow rate or pressure at the receiving end of a system, i.e. some kind of actuator. It is controlled by a power signal supplied to the coils of a torque motor. For reference, an example of one type of conventional servovalve is depicted in FIG. 1. The new groove arrangement for a servovalve described herein may be used with the type of servovalve shown in FIG. 1, as illustrated in FIGS. 2 to 5 and described below, but is not limited to this, and may also be used with other types of servovalves. The servovalve depicted in FIG. 1 and FIGS. 2 to 5 is therefore one example of a servovalve with which the new groove arrangement for a servovalve as described later and shown in FIGS. 2 to 5 can be used.

FIG. 1 shows an exploded view of a servovalve 100 comprising a first subsystem 102 for driving a second subsystem 104 containing a fluid such as hydraulic fluid, fuel or air. In the example shown, the fluid is fuel. The first subsystem 102 comprises a torque motor. The servovalve 100 is assembled about a longitudinal axis A as shown in FIG. 1.

The second subsystem 104 comprises a box shaped body 108 having a first square planar surface 110 centred on the longitudinal axis A, a second square planar surface 112, which forms the base of the box shaped body 108, centred on the longitudinal axis A, extending parallel to the first square planar surface 110 and separated from the first square planar surface 110 in a first axial direction, and first to fourth side walls joining the first and second square planar surfaces 110, 112, wherein the first side wall 114 is opposite the second side wall (not shown) and the third side wall 180 is opposite the fourth side wall (not shown).

A first cylindrical passage (not shown) extends through the box shaped body 108 along the longitudinal axis A. A second cylindrical passage 120 extends from the first side wall 114 to the second side wall 116 and intersects the first cylindrical passage 118 perpendicular thereto. A control port, a supply port and a return port (not shown) are provided to join with the second cylindrical passage 120. Lee plugs 128 are provided at either end of the second cylindrical passage 120 adjacent the respective first and second side walls 114, (not shown) to seal the second cylindrical passage 120 from the external environment.

The second subsystem 104 further comprises a cylindrical body 130 which is formed integrally with the box shaped body 108. The cylindrical body 130 is centred on the longitudinal axis A, has a radius which is less than the distance from the longitudinal axis A to the first side wall 114, and extends in a second axial direction from the first square planar surface 110 such that a first circular end of the cylindrical body 130 is integral with the first square planar surface 110. The cylindrical body 130 comprises a third cylindrical passage (not shown) which forms an extension of the first cylindrical passage (not shown) and extends from the first circular end of the cylindrical body 130 to the other circular end 131 thereof.

A hollow cylindrical chimney 134 (having an external radius of approximately 20% the radius of the cylindrical body 130) is formed integrally with the cylindrical body 130 and extends in the second axial direction therefrom so as to form a fourth cylindrical passage 136 which is coaxial and continuous with the third cylindrical passage 132.

The second subsystem 104 further comprises a flapper 138 which is cylindrical in shape, and an armature plate 140 which is substantially rectangular in cross section. The armature plate 140 is mounted such that in its resting position, the longitudinal axis (not shown) thereof extends perpendicular to the longitudinal axis A-A and parallel to the second cylindrical passage 120. The flapper 138 extends along the longitudinal axis A, through the centre of the armature plate 140 and through the fourth cylindrical passage 136 and the third cylindrical passage (not shown) and into the first cylindrical passage (not shown). When the torque motor is not magnetised and the armature plate 140 is in its resting position, the flapper 138 extends into the first cylindrical passage (not shown) and is in line with the control port (not shown). Nozzles 144, 146 are provided in the second cylindrical passage 120 on either side of the flapper 138. Nozzle 144 is located between the control port (not shown) and the supply port (not shown). Nozzle 146 is located between the control port (not shown) and the return port (not shown). With the flapper 138 in its resting position, the flapper 138 abuts against the nozzle 146 such that the nozzle 144 is open and fluid in the second subsystem 104 flows from the supply port (not shown) to the control port (not shown). In this position, the return port (not shown) is closed.

The first subsystem 102 comprises a torque motor having an annular pole piece 148, centred on the longitudinal axis A-A and arranged parallel to the armature plate 140 and spaced therefrom in the second axial direction, and a second annular pole piece 150 arranged parallel to the armature plate 140 and spaced therefrom in the first axial direction. The first subsystem 102 further comprises coils 152 wrapped around the armature plate 140 on either side and spaced from the centre thereof.

The first annular pole piece 148 comprises first and second flange elements 154, 156 extending over diametrically opposite first and second portions of the outer circumference thereof adjacent the coils 152, and extending in the first axial direction from the first annular pole piece 148 towards the armature plate 140. The second annular pole piece 150 comprises first and second flange elements 158, 160 extending over diametrically opposite first and second portions of the outer circumference thereof adjacent the coils 152, and extending in the second axial direction from the second annular pole piece 150 towards the armature plate 140.

As seen in FIG. 1, the first and second annular pole pieces 148, 150 are joined together and fixed to the second subsystem 104 by screws 162 which pass through holes 164 in the first and second annular pole pieces 148, 150 and are fixed in threaded holes 166 extending into the cylindrical body 130 from the first surface 133 of the valve body.

Permanent magnets 151 are also provided on opposite sides of the armature plate 140. The coils 152 are connected via lead wires (not shown) to a source of electricity (not shown) to thereby provide an electrical current to the coils 152. When the servovalve is assembled in this way, a surface (not shown) of the first annular pole piece 148 will rest upon and be in contact with the first surface 133 of the valve body.

The torque motor is an electromagnetic circuit such that in operation, current flowing through the coils 152 creates an electromagnetic force acting on the armature plate 140. The armature plate 140 is fixed to and supported on a torsion bridge 162 which extends perpendicular to the longitudinal axis A-A and the longitudinal axis of the armature plate 140. The torsion bridge 162 twists when torque is applied to it and so the torsion bridge 162, armature plate 140 and flapper 138 rotate due to the current flowing through the coils 152.

This rotation changes the position of the end of the flapper 138, moving it towards the supply port (not shown) such that the flapper 138 abuts against the nozzle 144. In this position, the supply port (not shown) is closed and fluid within the second subsystem 104 will flow from the control port (not shown) to the return port (not shown).

The first and second annular pole pieces 148, 150 are made from a soft magnetic annealed material such Supra 50, Mu-metal or similar. Materials of this type are very sensitive such that their magnetic properties may be deteriorated by exposure to bending forces, stress or strain. Due to imperfections in the flatness of the first surface 133 of the valve body, the force provided by the screws 162 will cause reaction forces and consequent bending moments in the first annular pole piece 148, thus reducing the magnetic efficacy of the first annular pole piece 148 and consequently reducing the efficacy of the torque motor.

Figure 2:
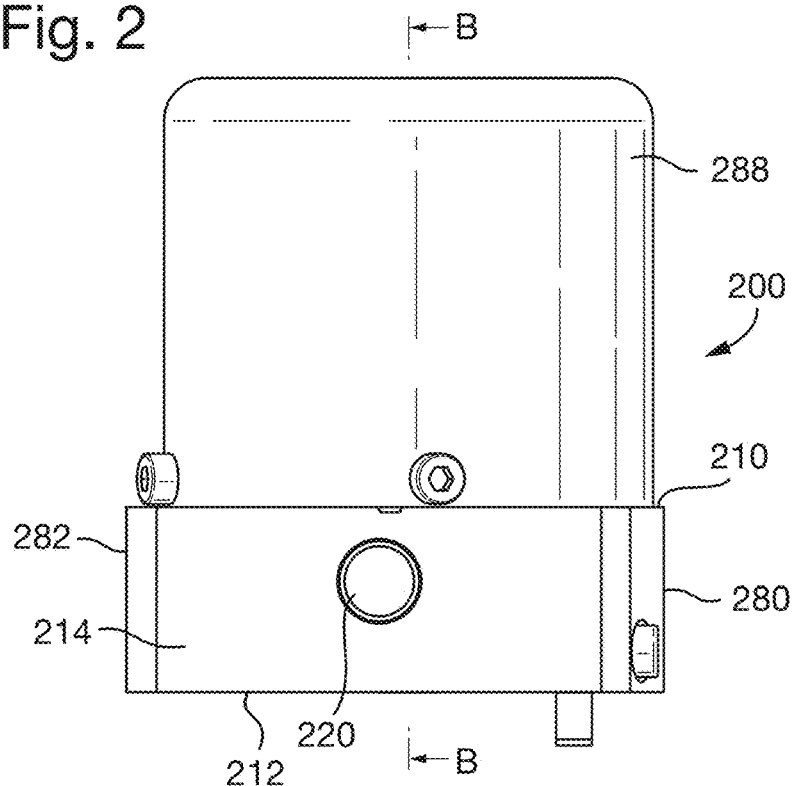
FIG. 2 is a side view of a servovalve according to an example of the present disclosure.
Figure 3:
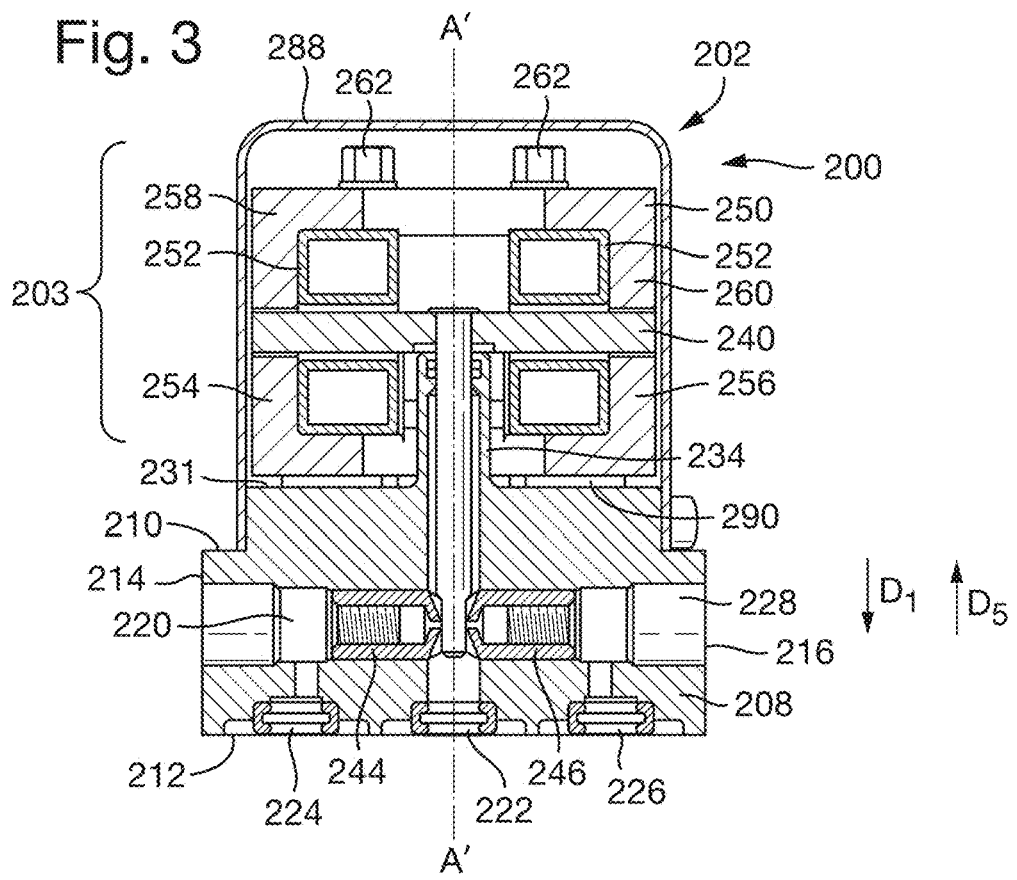
FIG. 3 is a cross-sectional view along line B-B of FIG. 2.

A new groove arrangement for a servovalve, and a servovalve embodying the new groove arrangement is now described with reference to FIGS. 2 to 5, 6a, 6b and 7a and 7b. FIG. 2 shows a servovalve 200 according to an example of the present disclosure. FIG. 3 shows a cross-section along line B-B of the servovalve 200 of FIG. 2. The servovalve 200 comprises a first subsystem 202 for driving a second subsystem 204 containing a fluid such as hydraulic fluid, fuel or air. The servovalve 200 is assembled about a longitudinal axis A'-A'.

Figure 4:
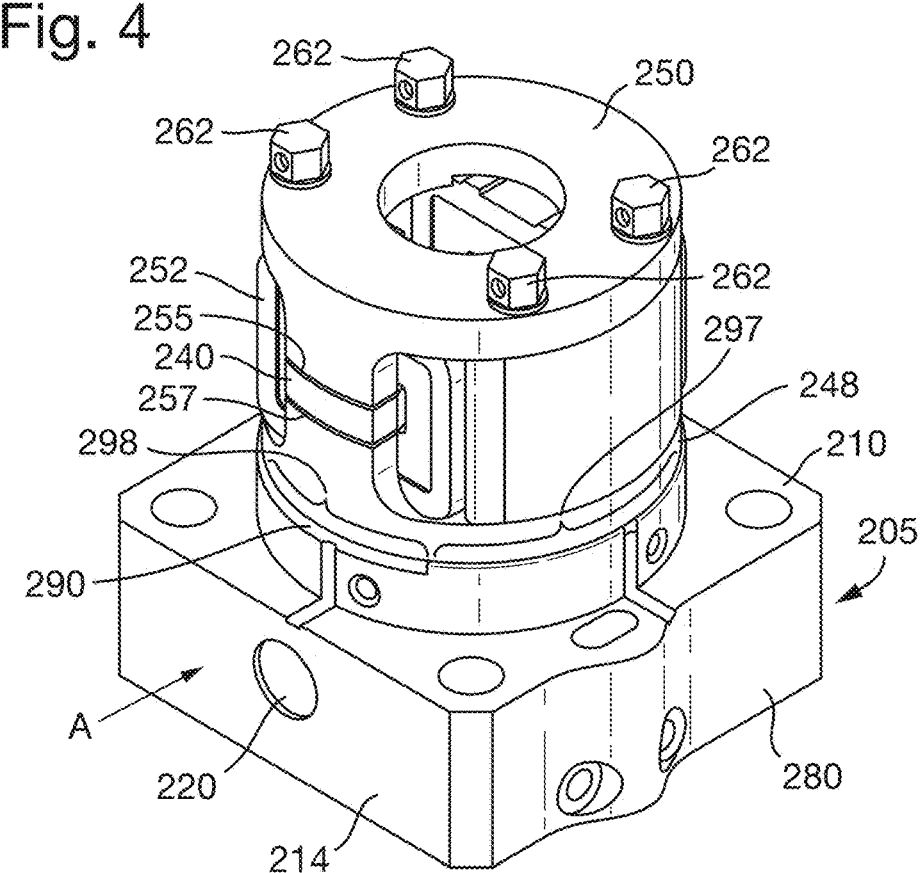
FIG. 4 is a perspective view of the servovalve of FIG. 3.
Figure 5:
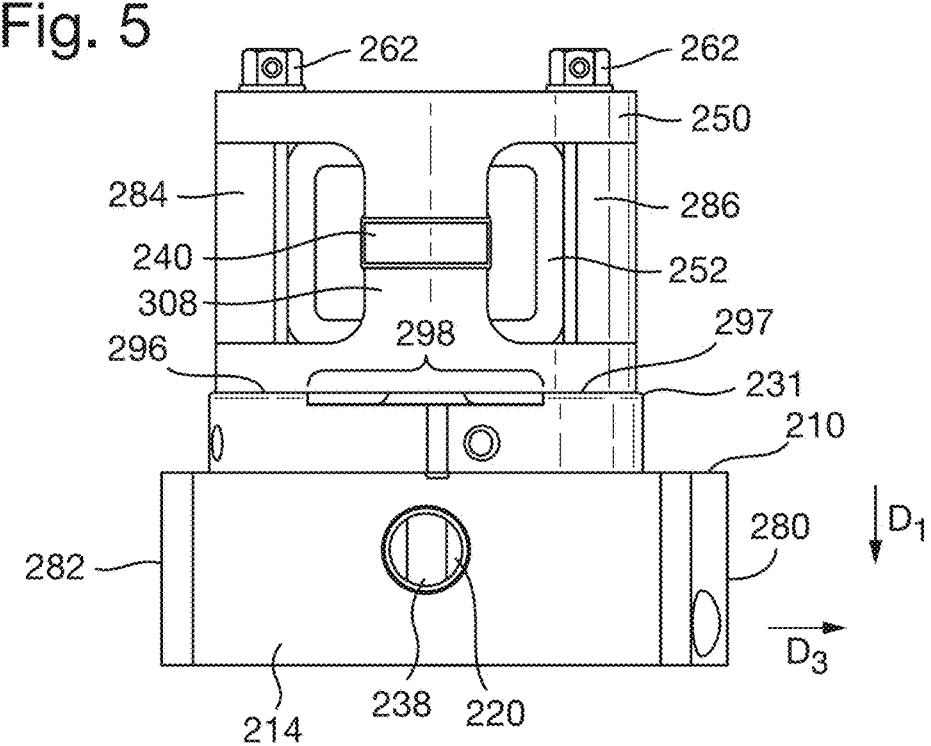
FIG. 5 is a side view of the servovalve of FIG. 4 looking in direction A.

The second subsystem 204 comprises a valve body 205 having an aluminium box shaped body 208 which is the same as the box shaped body 108 shown in FIG. 1. As seen in FIGS. 3 to 5, the box shaped body 208 has first and second side walls 214, 216 arranged opposite each other and third and fourth side walls 280, 282 arranged opposite each other and extending between the first and second side walls 214, 216. The box shaped body 208 further comprises a first square planar surface 210 and a second square planar surface 212 extending parallel to and spaced from the first square planar surface 210 in a first axial direction $D_1$. The first and second square planar surfaces 210, 212 are joined together by the side walls 214, 216, 280, 282. The second square planar surface 212 forms a second surface 213 of the valve body 205.

As in the example of FIG. 1, a first cylindrical passage 218 extends through the box shaped body 208 along the longitudinal axis A'-A'. A second cylindrical passage 220 extends from the first side wall 214 to the second side wall 216 and intersects the first cylindrical passage 218 perpendicular thereto. A control port 222 is provided in the second square planar surface 212 and extends axially in line with the first cylindrical passage 218. A supply port 224 is provided in the second square planar surface 212 to one side of the control port 222 and extends parallel to the first cylindrical passage 218 to join with the second cylindrical passage 220. A return port 226 is also provided in the second square planar surface 212 to the other side of the control port 222 and again extends parallel to the first cylindrical passage 218 to join with the second cylindrical passage 220. Lee plugs 228 are provided at either end of the second cylindrical passage 220 adjacent the respective first and second side walls 214, 216 to seal the second cylindrical passage 220 from the external environment.

The valve body 205 further comprises an aluminium cylindrical body 230 which is formed integrally with the box shaped body 208. The cylindrical body 230 is centred on the longitudinal axis A', has a radius which is less than the distance from the longitudinal axis A'-A' to the first side wall 214, and extends in a second axial direction from the first square planar surface 210 such that a first circular end (not shown) of the cylindrical body 230 is integral with the first square planar surface 210. The cylindrical body 230 comprises a third cylindrical passage 232 which forms an extension of the first cylindrical passage 218 and extends from the first circular end of the cylindrical body 230 to the other circular end thereof, which forms a first surface 231 of the valve body 205.

A hollow cylindrical chimney 234 is formed from aluminium, is integral with the cylindrical body 230 and extends in the second axial direction therefrom so as to form a fourth cylindrical passage 236 which is coaxial and continuous with the third cylindrical passage 232.

The second subsystem 204 further comprises a moveable member, more specifically a flapper 238 which is cylindrical in shape and is formed from austenitic stainless steel, and an armature plate 240. The armature plate 240 is mounted such that in its resting position, the longitudinal axis thereof (not shown) extends perpendicular to the longitudinal axis A'-A' and parallel to the second cylindrical passage 220. The flapper 238 extends along the longitudinal axis A'-A', through the centre of the armature plate 240 and through the fourth cylindrical passage 236 and the third cylindrical passage 232 into the first cylindrical passage 218. In its resting position when a torque motor 203 is not magnetised and the armature plate 240 is in its resting position, the flapper 238 is in line with the control port 222. Nozzles 244, 246 are provided in the second cylindrical passage 220 on either side of the flapper 238. With the flapper 238 in its resting position, fluid in the second subsystem 204 flows from the supply port 224 to the control port 222 and the return port 226.

The first subsystem 202 comprises a housing 288 which extends axially from the first square planar surface 210 so as to surround and cover the first subsystem 202. The first subsystem 202 further comprises a torque motor 203 having a first annular pole piece 248, centred on the longitudinal axis A'-A' and arranged parallel to the armature plate 240 of the second subsystem 204 and spaced therefrom in the first axial direction $D_1$, and a second annular pole piece 250 arranged parallel to the armature plate 240 and spaced therefrom in the second axial direction. The first subsystem 202 further comprises coils 252 wrapped around the armature plate 240 on either side and spaced from the centre thereof.

The first annular pole piece 248 comprises first and second flange elements 254, 256 extending over diametrically opposite first and second portions of the outer circumference thereof adjacent the coils 252, and extending in the second axial direction from the first annular pole piece 248 towards the armature plate 240. The second annular pole piece 250 comprises first and second flange elements 258, 260 extending over diametrically opposite first and second portions of the outer circumference thereof adjacent the coils 252, and extending in the first axial direction $D_1$ from the second annular pole piece 250 towards the armature plate 240. When the servovalve is assembled and as seen in FIGS. 5 and 6, the first and second flange elements 254, 256 of the first annular pole piece 248 extend towards the armature 240, leaving an air gap 255 there between. In a similar manner the first and second flange elements 258, 260 of the second annular pole piece 250 extend towards the armature 240, leaving an air gap 257 there between. Permanent magnets 284, 286 are also provided on opposite sides of the armature plate 240, following the curve of the annular pole piece 248 over a portion thereof and extending axially between the first and second annular pole pieces 248, 250. The coils 252 are connected via lead wires (not shown) to a source of electricity (not shown) to thereby provide an electrical current to the coils 252.

As seen in FIG. 4, the first and second annular pole pieces 248, 250 are joined together and fixed to the second subsystem 204 by members or screws 262 which pass through holes (not shown) in the first and second annular pole pieces 248, 250 and are fixed in attachment features, such as for example, threaded holes 266, extending into the cylindrical body 230 from the first surface 231 of the valve body 205.

The torque motor is an electromagnetic circuit such that in operation, current flowing through the coils 252 creates an electromagnetic force acting on the armature plate 240. The armature plate 240 is fixed to and supported on a torsion bridge 262 which extends perpendicular to the longitudinal axis A'-A' and perpendicular to the longitudinal axis of the armature plate 240. The torsion bridge can be formed of austenitic stainless steel.

The torsion bridge 262 is fixed to the valve body 205 by screws (not shown) extending through either end thereof and engaging with threaded holes 268 in the valve body 205.

The electromagnetic force created by current flowing through the coils will create a torque force which acts to twist the torsion bridge 262. Thus, in use, the torsion bridge 262, armature plate 240 and flapper 238 can be made to rotate due to the current flowing through the coils 252. This rotation changes the position of the end of the flapper 238, moving it towards the supply port 224 such that the flapper 238 abuts against the nozzle 244. In this position, the supply port 224 is closed and fluid within the second subsystem 204 will flow from the control port 222 to the return port 226.

Figure 6A:
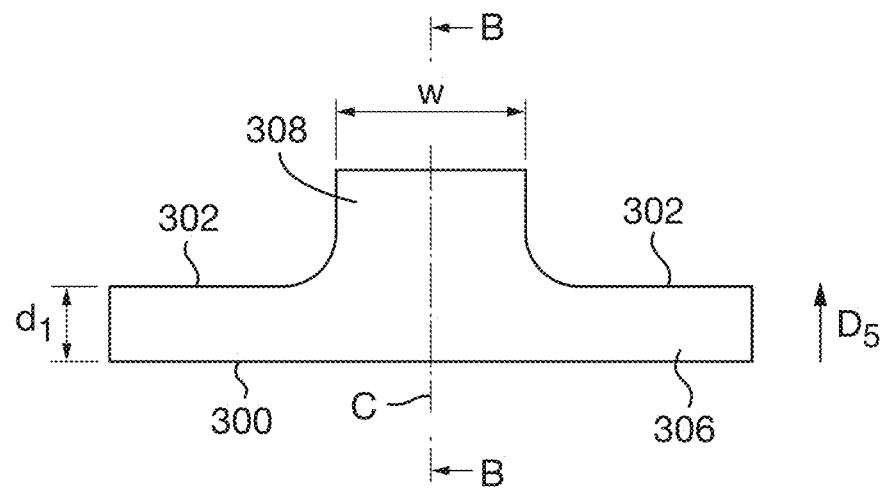
FIG. 6a is a front view from direction A of a pole piece of a servovalve according to the present disclosure.
Figure 6B:
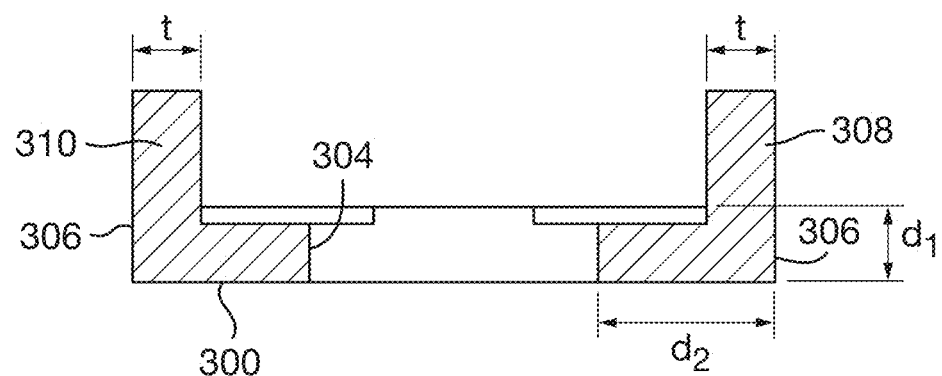

The first annular pole piece 248 of the servovalve according to the present disclosure will now be described in further detail with reference to FIGS. 6a and 6b. As seen, the first annular pole piece 248 is a solid body formed from an annealed soft magnetic material such as Supra 50, Mu-metal or similar.

The first annular pole piece 248 has a first annular surface or pole piece surface 300. A second annular surface 302 extends parallel to the first annular surface 300 and is spaced therefrom by a distance $d_1$ (defining the depth of the first annular pole piece 248) in the second axial direction. The radially inner edges of the first and second annular surfaces 300, 302 are joined together by an axially extending cylindrical surface 304. The radially outer edges of the first and second annular surfaces 300, 302 are joined together by an axially extending cylindrical surface 306. The thickness of the first annular pole piece 248 is the distance $d_2$ between the radially inner edge and the radially outer edge of the first annular surface 300.

A first flange 308 extends from the radially outer edge of the second annular surface 302 in the second axial direction, the first flange 254, 308 having a thickness t in the radial direction which is less than half the distance $d_2$ between the radially inner edge and the radially outer edge of the first annular surface 300. The flange 308 has a width w extending around approximately $\frac{1}{10}^{th}$ of the perimeter of the second annular surface 302, following the curve of the cylindrical surface 306.

A second flange 310 extends from the radially outer edge of the second annular surface 302 in the second axial direction and radially opposite the first flange 308, the second flange 310 having a thickness t in the radial direction which is less than half the distance $d_2$ between the radially inner edge and the radially outer edge of the first annular surface 300. The flange 310 has a width (not shown) and extends around approximately $\frac{1}{10}^{th}$ of the perimeter of the second annular surface 302, following the curve of the cylindrical surface 306.

It will be understood from the above that the pole pieces are shaped and have dimensions to aim to provide constant cross sections perpendicular to the magnetic flux flow axis along the path of magnetic flux flow.

Figure 7A:
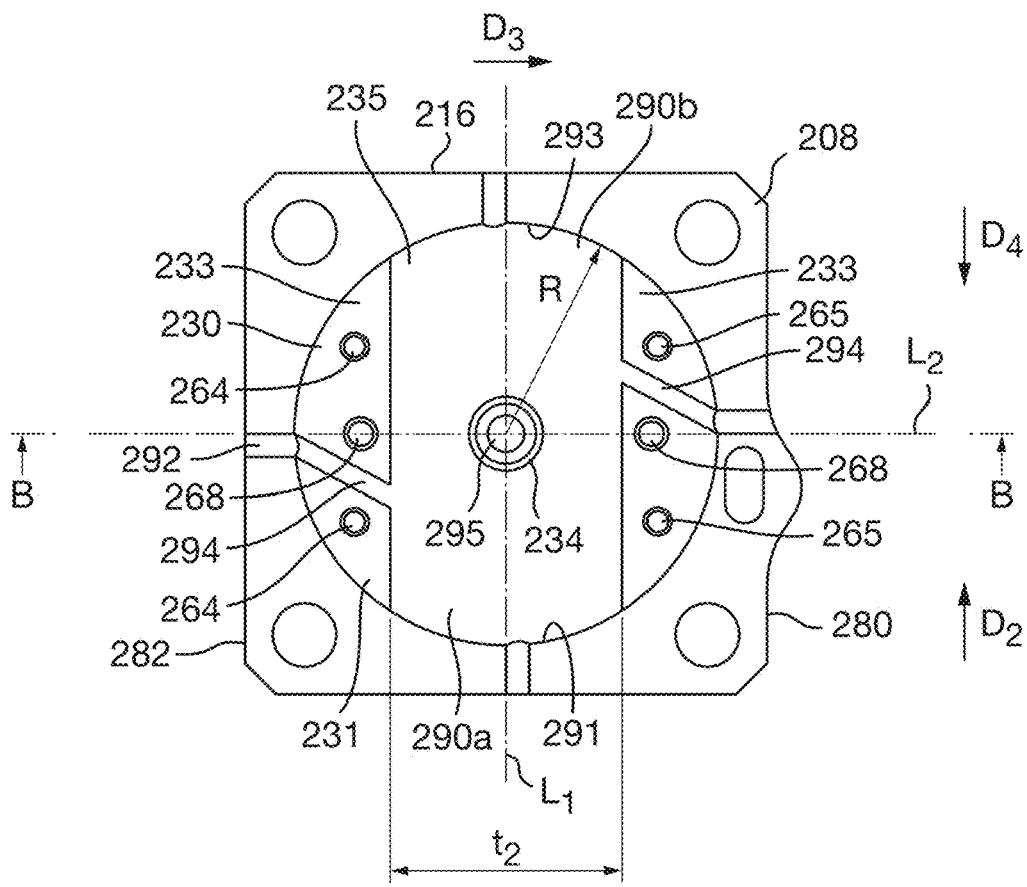
FIG. 7a is a top plan view of the second subsystem of a servovalve according to the present disclosure.
Figure 7B:
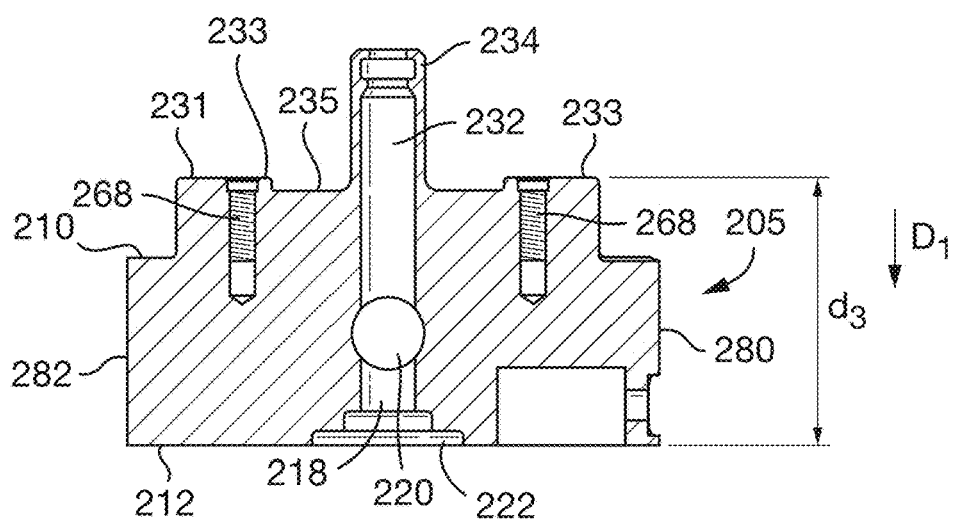

FIGS. 7a and 7b show a valve body 205 according to the present disclosure. As previously described, the valve body 205 comprises a first surface 231 spaced from a second surface 212 thereof in the second axial direction. The first surface 231 corresponds to the upper surface of the cylindrical body 230 and has a radius R as shown in FIG. 7a. A groove 290 is formed in the cylindrical body 230, and has a depth $d_3$ extending from the first surface 231 in the first axial direction. As seen in FIG. 7a, the groove 290 has a thickness $t_2$ in a third direction $D_3$ and extends across the cylindrical body 230 from an edge 291 of the first surface on one side thereof in a second direction $D_2$ to an opposite edge 293 on the other side such that a line L extending along the centre of the thickness of the groove passes through the centre 295 of the circular section of the cylindrical body 230. Thus, the groove 290 is made up of a first groove 290a extending from the edge 291 to the centre 295 in the second direction $D_2$ and a second grove 290b extending in a fourth direction D4 opposite to the second direction $D_2$ from the opposite edge 293 to the centre 295. The hollow cylindrical chimney 234 extends from the groove 290 as shown.

In an alternative embodiment (not shown), a first groove may be provided extending from a first side of the cylindrical body 230 towards the hollow cylindrical chimney 234 and a second groove may be provided extending from a second opposite side of the cylindrical body 230 towards the hollow cylindrical chimney such that no groove is provided in the portion surrounding the hollow cylindrical chimney. As the first pole piece 248 does not extend over the portion of the first surface 231 adjacent the hollow cylindrical chimney 234, the two grooves will function to improve the magnetic performance of the first pole piece 248 in a manner similar to the groove 290 of FIGS. 7a and 7b.

As seen in the figures, attachment features or threaded holes 264, 265 are provided in the cylindrical body 230 extending in the first axial direction D1 from the first surface 231 to receive and fix the screws 262 which pass through the first and second annular pole pieces 248, 250. Two holes 264 are provided in the first surface 231 adjacent the groove 290 to a first side thereof, one on either side of a line passing through the centre of the circular surface 231 and across the groove perpendicular thereto. Two further holes 265 are provided in the first surface 231 adjacent the groove 290 to a second opposite side thereof, one on either side of a line passing through the centre of the circular surface 231 and across the groove perpendicular thereto.

As seen in FIG. 7a, drainage channels 292 are provided in the first square planar surface 210 of the valve body 205. The drainage channels extend from the centre of the fourth side surface 282 and from the centre of the third side surface 280 toward the centre of the first square planar surface 210. A further drainage channel 294 is provided in the first surface 231 of the valve body 205 on either side of the groove 290 so as to connect the groove 290 with the drainage channels 292 in the first square planar surface 210.

When the servovalve 200 according to the present disclosure is assembled, the first pole piece 248 is positioned over or above the first surface 231 such that axial lines C passing through the centre of the width of the respective first and second flanges 308, 310 in an axial direction intersect the line L. It will be understood that those parts of the first pole piece 248 which are adjacent to one of the holes 264 and the screws 262 (corresponding to first 296 and third 297 portions of the pole piece) will be in contact with the first surface 231 of the valve body while the remaining portions (corresponding to second 298 and fourth (not shown) portions of the pole piece) of the first annular pole piece 248 including the first and second flanges 308, 310 will extend over the groove 290 such that there is no contact between the first annular surface 300 of the first pole piece 248 and the first surface 231 of the valve body 205. Thus, first areas 233 of the first surface 231 which surround the attachment features 264, 265 (and are located on either side of the groove 290a, 290b in the example shown in FIG. 7a) will be in contact with the first annular surface 300 of the first pole piece 248 when the servovalve 200 is assembled. A second area 235 of the first surface 231 which is removed from the attachment features 264, 265 (and in the example shown in FIG. 7a corresponds to the groove 290a, 290b) will not be in contact with the first annular surface 300 of the first pole piece 248 when the servovalve 200 is assembled. This will mean that the first annular pole piece 248 will not be subjected to bending or stress due to irregularities in the first surface 231 and so the magnetic domains of the soft magnetic material of the first annular pole piece 248 will be correctly aligned after assembly of the torque motor, thus improving performance thereof compared to a torque motor such as that described with reference to FIG. 1.

It will be appreciated that the servovalve according to the present disclosure may be used in applications such as aerospace applications in which the required performance parameters, dimensions and mass of the servovalve are limited. In one example of the present disclosure, the depth of the groove 290 can be minimised to minimise the depth $d_3$ of the valve body (from the first surface 231 thereof to the second surface 212 thereof) so as to allow the depth $d_1$ of the first annular pole piece 248 and the corresponding depth (not shown) of the second annular pole piece 250 to be maximised for the required performance parameters, dimensions and mass of the servovalve. By increasing the depth of the pole pieces, the pole pieces are made capable of transmitting more magnetic flux such that higher strength permanent magnets may be provided in the torque motor, the torque motor performance being improved without altering the overall dimensions thereof.

It will be understood that the dimensions of the groove 290 could be varied as required. The groove 290 has a constant thickness t with straight edges at the side thereof. This arrangement allows for ease of manufacture but it will be understood that the groove could take a different shape having a varying thickness.

Further, the groove 290 is shown as extending across the first surface 231 to leave only a small gap between the edges of the groove 290 and the holes 264, 265. In alternative embodiments, the groove may extend over a shorter thickness, leaving a greater gap between the edges of the groove 290 and the holes 264, 265.

It will be appreciated by those skilled in the art that the present disclosure has been illustrated by describing one or more specific examples thereof, but is not limited to these examples; many variations and modifications are possible, within the scope of the accompanying claims.

The invention claimed is:

1. A servovalve comprising:
a valve body; and
a torque motor, the torque motor including a pole piece having a substantially flat pole piece surface,
wherein the valve body comprises:
a first surface extending parallel and adjacent to the substantially flat pole piece surface; and
attachment features provided on the first surface and attaching the valve body to the pole piece;
wherein the first surface is contoured,
wherein the pole piece is positioned such that a first area of the first surface surrounding the attachment features is in contact with the substantially flat pole piece surface and a second area of the first surface removed from the attachment features is not in contact with the substantially flat pole piece surface, and
wherein the pole piece is annular and the substantially flat pole piece surface is annular,
wherein the pole piece includes a first flange extending from the pole piece and the first flange is aligned over the second area.

2. A servovalve as claimed in claim 1, wherein the first surface is contoured so as to maximise the second area of the first surface which is not in contact with the substantially flat pole piece surface.

3. A servovalve as claimed in claim 1, wherein the second area comprises a groove formed in the first surface.

4. A servovalve as claimed in claim 3, wherein a drainage channel is provided in the first surface, extending from the groove to an edge of the first surface.

5. A servovalve as claimed in claim 1, wherein the attachment features comprise a plurality of holes formed in the first surface and extending into the valve body for receiving mating attachment members in use.

6. A servovalve as claimed in claim 3, wherein the groove extends from an edge of the first surface towards a centre of the first surface.

7. A servovalve as claimed in claim 6, wherein a second groove is formed in the first surface, the second groove extending from an opposite edge of the first surface towards the centre of the first surface.

8. A servovalve as claimed in claim 7, wherein the groove and the second groove join to form a continuous groove extending from the first edge of the first surface to the opposite edge thereof.

9. A servovalve as claimed in claim 1, wherein the pole piece has a thickness, the pole piece surface extending across the thickness thereof, and wherein the second area of the first surface which is not in contact with the substantially flat pole piece surface extends across the thickness of the pole piece.

10. A servovalve as claimed in claim 1, wherein the pole piece further comprises:
a second pole piece surface spaced from the pole piece surface, wherein the first flange extends from the second pole piece surface, and wherein the first flange is aligned over the second area of the first surface which is not in contact with the substantially flat pole piece surface.

11. A servovalve as claimed in claim 1, wherein:

a second flange is provided opposite the first flange and extending from the second pole piece surface, and the second flange is aligned over the second area of the first surface which is not in contact with the substantially flat pole piece surface.

12. A method of improving the performance of a pole piece in a servovalve comprising:

forming a contoured surface in a first surface of a valve body of the servovalve; and positioning a pole piece that is annular and having a first flange adjacent to the first surface such that:

a substantially flat and annular pole piece surface of the pole piece extends parallel and adjacent to the first surface of the valve body;

a first area of the first surface surrounding attachment features on the first surface is in contact with the substantially flat pole piece surface; and a second area of the first surface removed from the attachment features is not in contact with the substantially flat pole piece surface, and aligning the first flange over the second area.

13. A method as claimed in claim 12, wherein forming the contoured surface comprises forming a groove in the first surface.

14. A method as claimed in claim 13, further comprising forming the groove to extend from a first side of the first surface to a second side thereof opposite the first side.

* * * * *